United States Patent [19]
Breit

[11] Patent Number: 5,884,873
[45] Date of Patent: Mar. 23, 1999

[54] SUCTION GENERATOR SYSTEM IN AN AIRCRAFT FOR MAINTAINING A LAMINAR BOUNDARY FLOW

[75] Inventor: Hubert Breit, Buxtehude, Germany

[73] Assignee: Daimler-Benz Aerospace Airbus GmbH, Hamburg, Germany

[21] Appl. No.: 851,589

[22] Filed: May 5, 1997

[30] Foreign Application Priority Data

May 4, 1996 [DE] Germany .................. 196 17 952.1

[51] Int. Cl.⁶ .................................................. B64C 21/06
[52] U.S. Cl. ...................... 244/209; 244/208; 244/130; 244/118.5
[58] Field of Search .................. 244/208, 209, 244/130, 118.5, 58

[56] References Cited

U.S. PATENT DOCUMENTS

| | | |
|---|---|---|
| 2,833,492 | 5/1958 | Fowler . |
| 2,867,392 | 1/1959 | Lear . |
| 3,149,804 | 9/1964 | Litz, Jr. . |
| 3,562,461 | 2/1971 | Kriechbaum . |
| 3,887,146 | 6/1975 | Bright . |
| 4,207,542 | 6/1980 | Shen . |
| 5,263,667 | 11/1993 | Horstman . |
| 5,353,685 | 10/1994 | Snow . |
| 5,707,027 | 1/1998 | Hiesener . |
| 5,743,493 | 4/1998 | McCaughan . |

FOREIGN PATENT DOCUMENTS

| | | |
|---|---|---|
| 736114 | 4/1943 | Germany . |
| 1280057 | 10/1968 | Germany . |
| 3621783 | 1/1988 | Germany . |
| 4128078 | 3/1992 | Germany . |

Primary Examiner—Charles T. Jordan
Assistant Examiner—Tien Dinh
Attorney, Agent, or Firm—W. F. Fasse; W. G. Fasse

[57] ABSTRACT

Boundary layer air on the skin structure of an aircraft is sucked off through suction holes in the aircraft skin structure by a least one ejector pump. The ejector pump is operated by at least one of several air flow sources. One source is the excess pressure in the passenger cabin at higher altitudes. The other air flow source is tap air from at least one aircraft engine. If necessary, one or the other or both air supply sources may be utilized to operate the ejector pump or pumps.

17 Claims, 1 Drawing Sheet

SUCTION GENERATOR SYSTEM IN AN AIRCRAFT FOR MAINTAINING A LAMINAR BOUNDARY FLOW

FIELD OF THE INVENTION

The invention relates to a suction system for generating suction at suction holes positioned in an aircraft skin structure particularly in flow critical areas of the aircraft for maintaining a laminar boundary flow by sucking off at least a portion of the boundary layer flow.

BACKGROUND INFORMATION

It is known to influence the boundary layer flowing along the surface of structural aircraft components such as the body, the wings, the tail assembly and along engine nacelles. For this purpose it is known to use suction generators having their own power source. Such separate power sources require their own fuel, they add to the weight of the aircraft, and they increase the maintenance effort and expense. Further, such suction generators in the form of compressors generally comprise rotating components which adversely affect the overall system reliability. Due to their own weight these compressors add to the fuel consumption of the aircraft in addition to requiring their own fuel.

It is known from German Patent Publication DE-AS 1,280,057 (Handley Page), published on Oct. 10, 1968 to equip aircraft wings with suction openings or porous elements in the outer wing skin requiring a substantial duct system connected to a suction generator arranged in the duct system or inside the aircraft. Details of the suction source are not disclosed. German Patent Publication DE 4,128,078 A1 (Coffinberry), published on Mar. 5, 1992 discloses a boundary layer suction system for an aircraft in which an ejector pump is used for the suction whereby the ejector pump itself is driven by an airflow generated by a suction air compressor unit driven by an electrical generator which in turn is driven by the gas turbine power plant of the aircraft. The sucked off boundary layer air is used as a source for compressed air and as cooling air for the environment control system (ECS). This type of generation of the suction air increases the operating costs of the aircraft so equipped, particularly since it increases the fuel consumption of the aircraft engines.

It is also known from German Patent Publication 736,114 (Wagner), published on Apr. 29, 1943 to connect an ejector pump for sucking off boundary layer air to the suction side of a precompressor of the internal combustion engine of the aircraft.

U.S. Pat. 3,149,804 (Litz, Jr.), issued on Sep. 22, 1964 discloses an anti-stall system in which a propellant gas generator is connected to an ejector for sucking off boundary layer air through holes in the wings.

German Patent Publication DE 3,621,783 (Pulch, Sr.), published on Jan. 7, 1988 discloses a hollow aircraft propeller wherein reduced pressure is generated to suck off boundary layer air from the surface of the propeller. The suction is derived from an ejector system driven by the engine exhaust gas.

OBJECTS OF THE INVENTION

In view of the above it is the aim of the invention to achieve the following objects singly or in combination:

to selectively apply to an ejector pump compressed air readily available from different sources in the aircraft especially the pressurized passenger cabin and/or tap air from at least one aircraft engine without the need for an additional power source for operating the ejector pump to provide the suction where needed at holes through the aircraft skin;

to utilize the pressure difference between the pressurized cabin space and a nonpressurized space in the aircraft particularly when the aircraft has reached sufficient altitudes for this purpose;

to improve the reliability of a system for maintaining the boundary layer air flow a laminar flow;

to reduce the maintenance power, effort and expense for a boundary layer flow control of an aircraft; and to construct the suction system in such a way that its own weight is negligible and so that it does not significantly contribute to the overall weight of the aircraft.

SUMMARY OF THE INVENTION

The above objects have been achieved according to the invention by a suction system for an aircraft with a skin structure, for sucking off boundary layer air from the skin structure through suction holes in the skin structure. The suction system comprises at least one ejector pump including an outlet port for ejected air and a suction port connected through a suction duct to a respective suction hole in the aircraft skin. The ejector pump comprises at least two pump or flow inlet ports, one of which is connected to a source of pressurized air through a respective duct, whereby the source of pressurized air is preferably used or spent air out of the passenger cabin which must be replaced anyway by an air conditioning system. The other pump or flow inlet port of the ejector pump is connected through a respective tap air flow duct to tap air from an aircraft engine, preferably more than one engine. A flow control valve in the tap air duct permits controlling the flow of tap air from the aircraft engine to the other or further flow inlet port, whereby the ejector pump is operable by a flow of pressurized air when the pressurized air is available, for example at higher altitudes because the passenger cabin is pressurized at the respective altitude, and whereby the ejector pump can simultaneously or selectively be operated by the tap air from an aircraft engine when the latter is running. Thus, the ejector pump or a plurality of such pumps can be operated from one source of air flow or from the other source of air flow, or even from both sources simultaneously, whereby the flow control of the air operating the ejector pump is preferably dependent on an air pressure sensor providing a valve control signal depending on the altitude at which the aircraft is flying.

Using the spent pressurized air out of the aircraft cabin for operating an ejector pump which in turn helps keeping the boundary layer flow a laminar flow particularly in flow critical areas of the aircraft structure including the wings, tail and nacelle structures, is very economical because the spent air from the aircraft cabin must be removed any way.

Another advantage of the invention is seen in that these ejector pumps are of lightweight construction and thus hardly add to the weight of the aircraft compared to conventional suction systems requiring their own power supply source or sources.

BRIEF DESCRIPTION OF THE DRAWINGS

In order that the invention may be clearly understood, it will now be described, by way of example, with reference to the accompanying drawing comprising a single FIGURE illustrating schematically a tail end of an aircraft with the present system installed in the nonpressurized area or section of the aircraft body tail end.

DETAILED DESCRIPTION OF PREFERRED EXAMPLE EMBODIMENTS AND OF THE BEST MODE OF THE INVENTION

Figure 1:
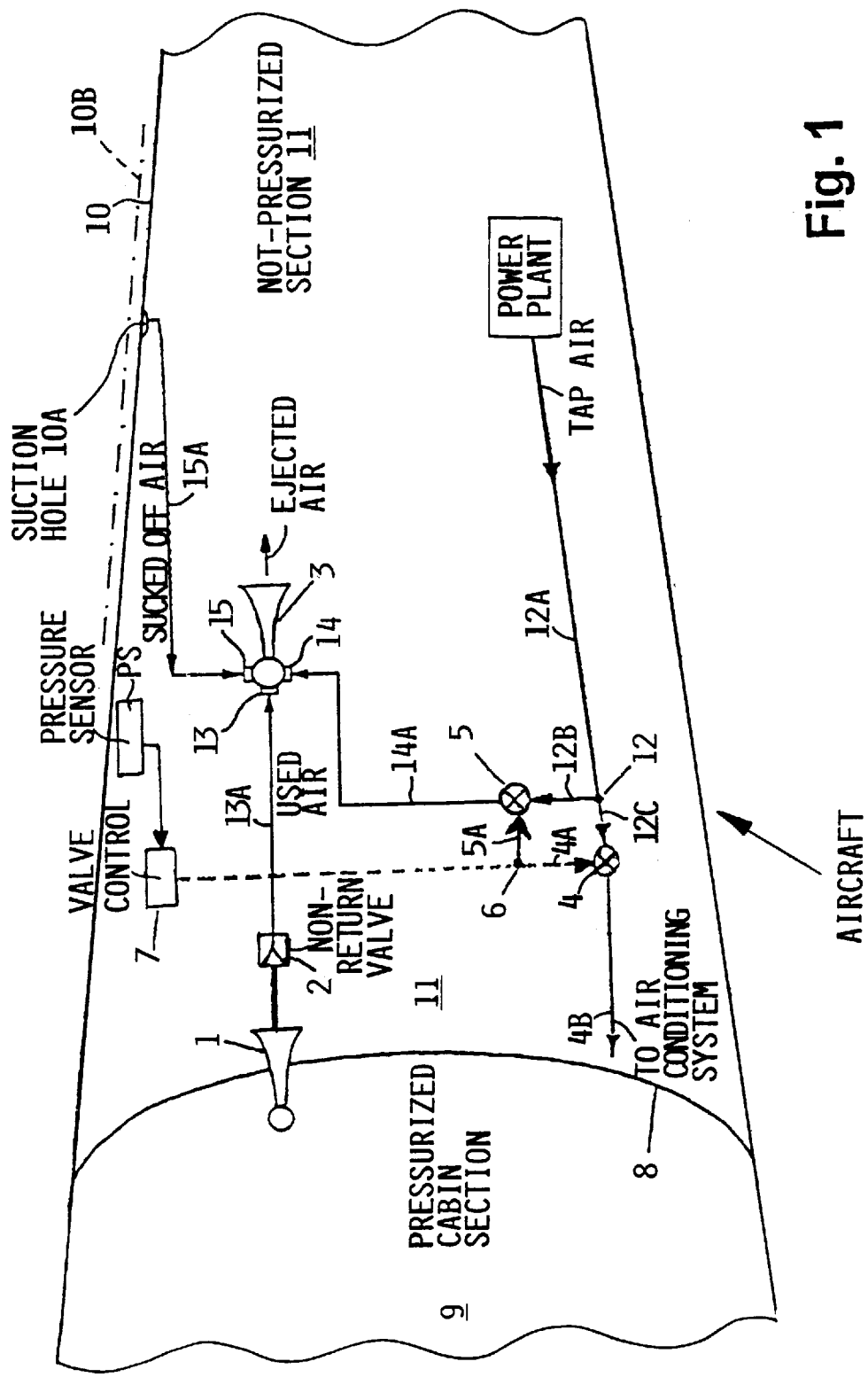
FIG. 1 shows in full lines air flow connections in the form of air ducts or air hoses. Electrical connections are shown by dashed lines. A boundary layer 10B is shown by a dash-dotted line along the surface of the skin structure 10 of the aircraft body.

The present system comprises a plurality of ejector pumps 3, only one of which is shown in the Figure to simplify the illustration. These pumps are arranged in a not-pressurized section 11 of the aircraft for example but not necessarily the tail section of the aircraft. Each pump comprises three inlet ports 13, 14, and 15. One inlet port 15 forms a suction port which is connected through a suction air duct 15A to a suction port or hole 10A in the aircraft skin structure 10 for removing air from the boundary layer 10B. Another inlet port 13 of the ejector pump 3 forms a first flow port that is connected through a pressurized air duct 13A to the cabin 9 through a bulkhead 8 separating the pressurized cabin area 9 from the not-pressurized section 11. Preferably, the connection of the air duct 13A through the bulk head 8 is accomplished through a controllable flow valve 1 functioning as a safety valve. It is further preferable that a nonreturn valve 2 is connected in the air duct 13A between the valve 1 and the inlet 13 and thus, with regard to the air flow, in series with the safety valve 1.

A second flow port 14 of the pump 3 is connected through a first electrically or electronically controllable valve 5 and through a flow duct 14A to a junction 12 in a tap air flow duct 12A, 12B and 12C connected to at least one power plant or engine of the aircraft. The tap air duct junction 12 is also connected through the flow duct section 12C and an electrically or electronically controllable valve 4 to an air conditioning system of the aircraft which feeds fresh, conditioned air into the cabin 9.

Both valves 4 and 5 are connected through an electrical control cable 6 to a valve control unit 7. A control conductor 4A forming part of the electrical cable 6 connects the valve 4 to the control unit 7. The cable 6 includes a further control conductor 5A connecting the valve 5 to the valve control 7. The valve control 7 is responsive to a pressure sensor PS. The valve operation will be described in more detail below.

The ejector pump 3 comprises at least one Laval nozzle and a diffuser forming integral components of the ejector pump 3 with the diffuser arranged downstream of the Laval nozzle so that the diffuser forms the exit of the pump for discharging ejected air into the not-pressurized section 11 of the aircraft body.

For operating the present system, the flow of air necessary to operate the pump 3 as an ejector is provided through the air conduit 13A or through the air conduit 14A or through both conduits 13A and 14A depending on the open or closed state of the valve 5. A sufficient flow through the air conduit 13A is available only when the pressure in the cabin 9 sufficiently exceeds the pressure prevailing in the not-pressurized section 11. The air flow through the tap air conduits 12A, 12B, and 14A depends on the operation of the respective aircraft engine and on the control of the valves 4 and 5 which will normally be automatic in response to respective signals from the control unit 7 through the respective conductors 4A and 5A. It is preferred that the valves 4 and 5 may be operated manually in addition to the automatic control in response to the altitude at which the aircraft is flying as sensed by the pressure sensor PS.

At low altitudes up to about 21,000 feet, the pressure in the cabin 9 or rather the pressure difference between the cabin pressure and the outside pressure is normally insufficient to operate the pump 3. Therefore, at low altitudes the valve 5 is open and the valve 4 is closed. The valve 4 is connected through a further tap air flow conduit 4B to an air conditioning system with the valve 5 open and the valve 4 closed the pump 3 is operated by tap air from the engine. Thus, even at these lower altitudes the boundary layer air sucked off through the conduit 15A through the suction hole 10A contributes to keeping the boundary layer flow a laminar flow particularly in flow critical areas along the skin structure of the aircraft.

When the aircraft reaches higher altitudes, the pressure differential between the pressure in the cabin 9 and the outside of the aircraft which corresponds to the pressure in the not-pressurized section 11 becomes sufficient to operate the pump 3, whereby the valve control unit 7 automatically closes the valve 5 and opens the valve 4 so that tap air flows completely to the air conditioning system of the aircraft. At these higher altitudes the air conditioning system receives tap air and used air out of the pressurized cabin 9 while returning treated or conditioned air back into the pressurized cabin 9. Additionally, used-up or spent pressurized air is passing through the flow safety valve 1, through the nonreturn valve 2 and the conduit 13A to the inlet 13 of the pump 3 to sustain the suction operation of the ejector pump 3 at higher altitudes at which the valve 5 is closed and the valve 4 is open.

In exceptional situations for example when the pressure differential between the cabin space 9 and the atmospheric pressure around the aircraft including the pressure in section 11 of the aircraft becomes insufficient, it is possible to reinforce the operation of the pump 3 by opening the valve 5 so that both flow inlet ports 13 and 14 receive air to operate the ejector pump 3. The valve control unit 7 performs this operation automatically in response to the pressure sensor PS, whereby the valve 4 may be kept open or partially open or closed. In this exceptional situation it is preferable to continue operating the air conditioning system to sustain the minimum pressure necessary in the cabin space 9 for the safety of the passengers.

The Laval nozzle of the pump 3 makes sure that reduced pressure is established at the suction holes 10A so that at least a portion of the boundary layer air is sucked off to maintain a laminar flow. The sucked off boundary layer air entering into the port 15 of the pump 3 is ejected together with the air operating the pump through the diffuser forming the discharge port of the pump 3 for the air ejected by the pump 3. This air may be ejected into the not- pressurized section 11 of the aircraft.

The suction holes 10A, only one of which is shown in the FIGURE, are preferably arranged along the leading edge of the wings, along the leading edge of the elevator assembly, along the leading edge of the rudder and, if desired, also in the engine nacelles. By maintaining the boundary layer flow laminar in these flow critical areas the invention achieves the advantage of an improved aerodynamic characteristic of the overall aircraft structure which results in a reduced fuel consumption of the aircraft engines. The flow volume of air into the ports 13 and 14 of the pump 3 is so selected that the required volume of sucked off air through the holes 10A maintains a laminar flow at the above mentioned locations. The number of ejector pumps 3 will depend on the size of the aircraft and the desired boundary layer flow characteristics.

Normally, a plurality of safety valves 1 will be provided in the bulkhead 8 that separates the pressurized cabin 9 from the nonpressurized section 11. Thus, each pump is connected to the cabin by its safety valve 1. However, depending on the number of required pumps 3 it may be preferable to feed several pumps through one valve 1 and through a respective nonreturn valve 2 whereby a common collector air flow conduit 13A is in turn connected to the flow inlets 13 of more than one pump 3.

It is possible to not use the outflow valves 1 altogether, in which case the nonreturn valves 2 would be directly connected with their inlet end to holes in the bulkhead 8 in an airtight manner so that there would be no leaks through the bulkhead 8 into the not-pressurized section 11. The operation and function of the system is the same as described above regardless how many ejector pumps 3 are used. Each of these pumps may be connected with its flow inlet port 13 individually to receive pressurized air from the cabin 9 or a plurality of such pumps may be connected to a common conduit 13A provided upstream or downstream of the nonreturn valve 2. Such modifications do no influence the overall operation as described above.

Although the invention has been described with reference to specific example embodiments, it will be appreciated that it is intended to cover all modifications and equivalents within the scope of the appended claims.

What is claimed is:

1. An aircraft comprising an aircraft cabin, a skin structure enclosing said aircraft cabin, a suction system for sucking off boundary layer air through suction holes in said skin structure, said suction system comprising at least one ejector pump (3) including an outlet port for ejected air, a suction port (15), and first and second flow inlet ports (13, 14), said system further comprising a suction duct (15A) connecting said suction port (15) to at least one respective suction hole (10A) of said suction holes, wherein said aircraft cabin is pressurizable for providing a source (9) of pressurized air, a pressure air duct (13A) connecting said first flow port (13) to said source (9) of pressurized air, a tap air duct (14A, 12A, 12B) connecting said second flow port (14) to an aircraft engine, and a flow control valve (5) in said tap air duct for controlling the flow of tap air from said aircraft engine to said second flow port, whereby said ejector pump (3) is operable by a flow of pressurized used cabin air when said aircraft cabin is pressurized and/or by tap air when said aircraft engine is running.

2. The aircraft of claim 1, further comprising an air conditioning system, a junction (12) in said tap air duct (12A, 12B) upstream of said flow control valve (5), and a further flow control valve (4) connected to said junction (12) and to said air conditioning system for replenishing withdrawn used cabin air in said pressurizable aircraft cabin by conditioned air.

3. The aircraft of claim 2, further comprising a pressure responsive valve control (7) operatively connected to said flow control valve (5) and to said further flow control valve (4) for controlling the flow of air for operating said ejector pump (3) in response to a pressure difference between pressure inside said aircraft cabin (9) and pressure outside said aircraft cabin.

4. The aircraft of claim 3, wherein said further flow control valve (4) is closed when first mentioned said flow control valve (5) is open and vice versa.

5. The aircraft of claim 3, wherein said pressure responsive valve control (7) keeps said flow control valve (5) open at altitudes up to about 21,000 feet while keeping said further flow control valve (4) closed, whereby said ejector pump (3) is operated by said tap air, and wherein said valve control (7) keeps said flow control valve (5) closed at altitudes above about 21,000 feet while keeping said further flow control valve (4) open, whereby said ejector pump (3) is operated by said used cabin air at said higher altitudes and by tap air at lower altitudes and boundary layer air is sucked off at all altitudes.

6. The aircraft of claim 3, further comprising a pressure sensor (PS) for sensing a differential pressure between a pressure in said aircraft cabin (9) and outside said aircraft cabin, said pressure sensor (PS) being connected to said valve control (7) for opening said flow control valve when said differential pressure is insufficient for operating said ejector pump (3) with used cabin air to thereby operate said ejector pump by said tap air.

7. The aircraft of claim 1, further comprising at least one flow discharge safety valve (1) connecting said pressure air duct (13A) to said aircraft cabin.

8. The aircraft of claim 1, further comprising at least one nonreturn valve (2) in said pressure air duct (13A).

9. The aircraft of claim 1, wherein said ejector pump (3) comprises a Laval nozzle and a diffuser forming an exit of said Laval nozzle.

10. The aircraft of claim 1, further comprising a safety valve (1) connecting said pressurized air duct (13A) to said pressurized air source (9), and a nonreturn valve (2) connected in series with said safety valve (1) in said pressurized air duct (13A).

11. The aircraft of claim 1, further comprising a nonreturn valve (2) connected in said pressure air duct (13A) between said pressurized air source (9) and said first flow port (13) of said ejector pump (3).

12. The aircraft of claim 11, further comprising a not-pressurized section in said aircraft, a bulkhead (8) between said pressurizable aircraft cabin (9) and said not pressurized section (11) within said aircraft, said pressure air duct (13A) being directly connected to and through said bulkhead (8) to said aircraft cabin (9), and wherein said ejector pump (3) is positioned in said not-pressurized section (11) of said aircraft.

13. The aircraft of claim 12, wherein said not-pressurized section is a not-pressurized tail section (11), said bulkhead (8) separating said not-pressurized tail section (11) of said aircraft from said pressurizable aircraft cabin (9).

14. The aircraft of claim 1, comprising a plurality of ejector pumps each comprising a first flow inlet and a second flow inlet, each first flow inlet (13) being connected to said aircraft cabin (9), each second flow inlet (14) being connected to tap air from at least one aircraft engine.

15. The aircraft of claim 14, further comprising a common pressurized air supply first duct connected to all of said first inlets (13), and a tap air supply second duct connecting said second inlets (14) to said at least one aircraft engine.

16. The aircraft of claim 15, further comprising a nonreturn valve (2) in said pressurized air supply first duct and a controllable valve (5) in said tap air supply second duct.

17. The aircraft of claim 16, further comprising a safety valve (1) connecting said pressurized air supply first duct to said aircraft cabin, whereby said safety valve is connected in series with said non-return valve (2) in said pressure air supply first duct.

\* \* \* \* \*